(12) United States Patent
Figgins et al.

(10) Patent No.: US 8,601,779 B1
(45) Date of Patent: Dec. 10, 2013

(54) SYSTEM FOR CUTTERBAR SUPPORT HAVING TORSION DEVICE WITH ELASTIC MATERIAL AND LOAD LIMITING APPARATUS

(75) Inventors: Ryan M. Figgins, New Holland, PA (US); Geert P. Mortier, Ghent (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/602,373

(22) Filed: Sep. 4, 2012

(51) Int. Cl.
*A01D 43/00* (2006.01)

(52) U.S. Cl.
USPC .......................................................... 56/181

(58) Field of Classification Search
USPC .............. 56/181, 153, 15.8, 10.2 E, 504, 17.2
See application file for complete search history.

(56) References Cited

U.S. PATENT DOCUMENTS

| | | | |
|---|---|---|---|
| 2,173,652 A | 9/1939 | Lee et al. | |
| 2,811,347 A | 10/1957 | Cass | |
| 3,131,554 A | 5/1964 | Hornschuch et al. | |
| 4,573,308 A * | 3/1986 | Ehrecke et al. | 56/14.4 |
| 4,599,852 A * | 7/1986 | Kerber et al. | 56/15.8 |
| 4,724,661 A * | 2/1988 | Blakeslee et al. | 56/208 |
| 4,826,145 A | 5/1989 | Moore et al. | |
| 5,157,905 A * | 10/1992 | Talbot et al. | 56/15.9 |
| 5,213,436 A | 5/1993 | Fichtner et al. | |
| 5,464,371 A * | 11/1995 | Honey | 460/20 |
| RE35,543 E * | 7/1997 | Patterson | 56/14.4 |
| 5,987,122 A | 11/1999 | Daffara et al. | |
| 6,146,044 A | 11/2000 | Calvet | |
| 6,594,983 B1 * | 7/2003 | Krone et al. | 56/341 |
| 6,675,568 B2 * | 1/2004 | Patterson et al. | 56/208 |
| 7,207,164 B2 * | 4/2007 | Bomleny | 56/10.2 E |
| 7,222,475 B2 * | 5/2007 | Bomleny et al. | 56/10.2 E |
| 7,430,846 B2 * | 10/2008 | Bomleny et al. | 56/10.2 E |
| 7,478,521 B2 * | 1/2009 | Coers et al. | 56/208 |
| 7,877,976 B2 * | 2/2011 | Honas et al. | 56/208 |
| 7,930,871 B1 | 4/2011 | Figgins | |
| 7,950,212 B1 | 5/2011 | Figgins et al. | |
| 8,051,633 B2 | 11/2011 | Figgins et al. | |
| 8,061,115 B2 * | 11/2011 | Honas et al. | 56/181 |
| 8,191,345 B2 * | 6/2012 | Honas et al. | 56/181 |
| 2004/0065069 A1 * | 4/2004 | Dunn et al. | 56/10.4 |
| 2005/0006832 A1 | 1/2005 | Hoshi et al. | |
| 2007/0204584 A1 * | 9/2007 | Coers et al. | 56/15.8 |
| 2008/0072560 A1 * | 3/2008 | Talbot | 56/208 |
| 2008/0078155 A1 * | 4/2008 | Coers et al. | 56/15.8 |

(Continued)

FOREIGN PATENT DOCUMENTS

JP 60184735 A 9/1985

*Primary Examiner* — Árpád Fábián-Kovács
(74) *Attorney, Agent, or Firm* — Patrick M. Sheldrake; Seyed V. Sharifi T.

(57) ABSTRACT

A system for supporting a cutterbar of a crop harvesting header includes a first arm pivotably secured to the header. The first arm includes a first portion configured to support the cutterbar. The first arm includes a second portion including a torsion device having a mass of elastic material connected to an adjustment assembly. The second portion is configured to be pivotably rotatable about an axis by the adjustment assembly to selectably increase or decrease a force appliable to the first portion in order to raise or lower the first portion with respect to the header. A load limiting apparatus limits an amount of torsional force that is applied to the mass of elastic material by pivotable rotation of the second portion about the axis.

20 Claims, 10 Drawing Sheets

(56) References Cited

U.S. PATENT DOCUMENTS

| | | | |
|---|---|---|---|
| 2009/0084080 A1* | 4/2009 | Coers et al. | 56/15.8 |
| 2009/0277144 A1* | 11/2009 | Honas et al. | 56/153 |
| 2010/0043372 A1* | 2/2010 | Honas et al. | 56/181 |
| 2010/0269472 A1* | 10/2010 | Coers et al. | 56/15.8 |
| 2011/0113745 A1* | 5/2011 | Honas et al. | 56/181 |
| 2011/0232251 A1* | 9/2011 | Figgins et al. | 56/17.1 |
| 2012/0023885 A1* | 2/2012 | Honas et al. | 56/181 |
| 2012/0192538 A1* | 8/2012 | Honas et al. | 56/181 |

* cited by examiner

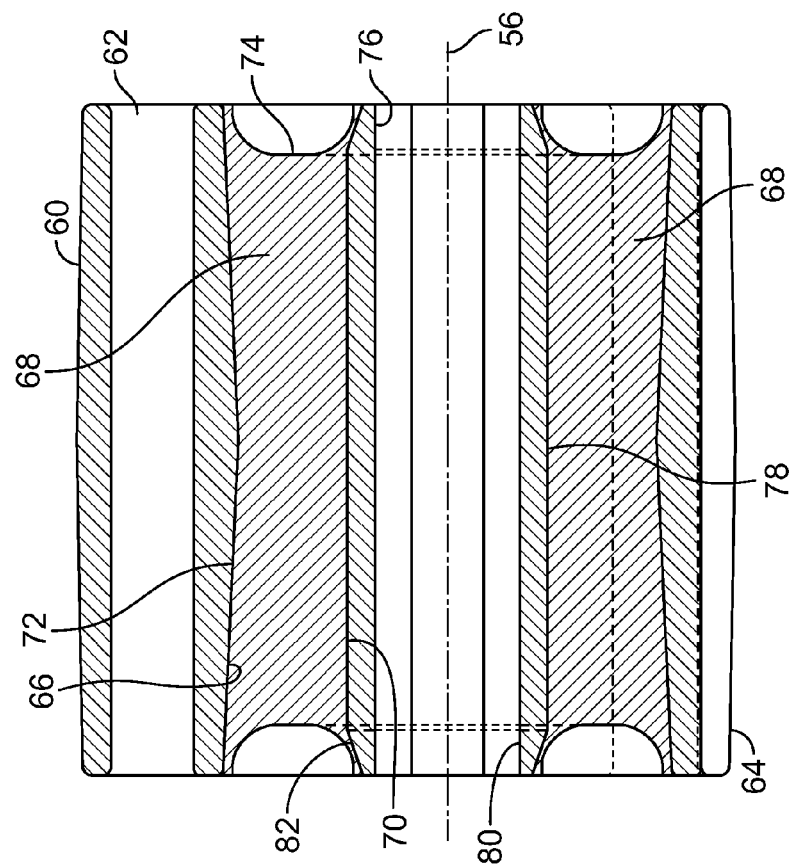
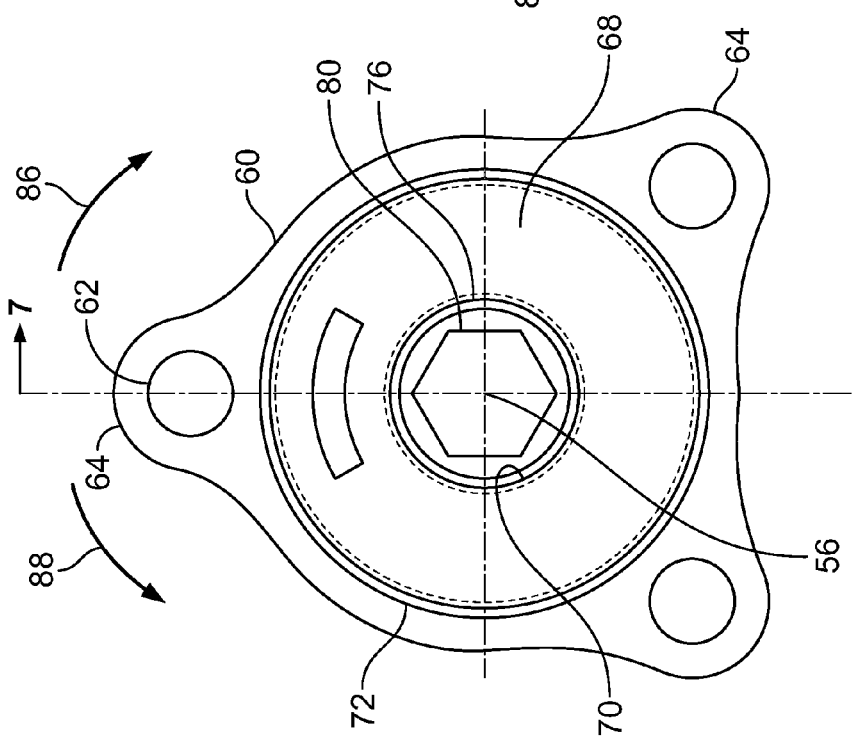
FIG. 7
FIG. 6

SYSTEM FOR CUTTERBAR SUPPORT HAVING TORSION DEVICE WITH ELASTIC MATERIAL AND LOAD LIMITING APPARATUS

FIELD OF THE INVENTION

The present invention relates generally to crop harvesting headers for use with crop harvesting devices. It relates more particularly to a system for supporting a cutterbar of a crop harvesting header.

BACKGROUND OF THE INVENTION

The cutting assemblies of the known large headers of plant-cutting machines (e.g., combine, windrower) are typically driven by an oscillating drive, which can include, but is not limited to, an eccentric shaft on a rotating hub, a wobble drive, or a similar well-known commercially-available device. A cutting assembly is typically supported by a flexible cutterbar that spans the width of the opening of the crop harvesting header. The cutterbar is typically supported by arms that extend transverse to the cutterbar. Unfortunately, the weight of the cutting assembly is not uniformly distributed across the cutting width of the harvesting header, possibly causing bowing of the cutterbar, and the cutting assembly, resulting in uneven cutting height of the plant, as well as other undesirable results.

In response, Applicant has made great strides in this area through the use of a torsion device having elastic material, such as disclosed in U.S. Pat. No. 8,051,633, titled Cutterbar Adjustment Support For A Harvesting Header. However, further improvements are needed, such as maintaining performance while extending the service life of the elastic material.

What is needed is a system that provides substantially uniform support along the length of the cutting assembly by permitting selective adjustment of the forces the arms provide to the cutterbar, while maintaining performance and extending the service life of the system.

SUMMARY OF THE INVENTION

The present invention relates to a system for supporting a cutterbar of a crop harvesting header including a first arm pivotably secured to the header. The first arm includes a first portion configured to support the cutterbar, the first arm including a second portion including a torsion device having a mass of elastic material connected to an adjustment assembly. The second portion is configured to be pivotably rotatable about an axis by the adjustment assembly to selectably increase or decrease a force appliable to the first portion in order to raise or lower the first portion with respect to the header. A load limiting apparatus is operatively connected to the torsion device for limiting an amount of torsional force that is applied to the mass of elastic material by pivotable rotation of the second portion about the axis. The adjustment assembly includes a second arm interconnecting the torsion device and an adjustment device having a first segment, the adjustment device configured to movably receive a connecting adjustment device. The first segment of the adjustment device is configured to follow a predetermined path in a first direction with respect to the axis in response to movement of the adjustment device in a first direction with respect to the first adjustment device. The first segment of the adjustment device is configured to follow a predetermined path in a second direction with respect to the axis in response to movement of the connecting adjustment device in a second direction opposite the first direction with respect to the adjustment device.

The present invention further relates to a system for supporting a cutterbar of a crop harvesting header including a first arm pivotably secured to the header. The first arm includes a first portion configured to support the cutterbar, the first arm including a second portion including a torsion device having a mass of elastic material connected to an adjustment assembly, the second portion configured to be pivotably rotatable about an axis by the adjustment assembly to selectably increase or decrease a force appliable to the first portion in order to raise or lower the first portion with respect to the header. A load limiting apparatus is operatively connected to and contained inside the torsion device for limiting an amount of torsional force that is applied to the mass of elastic material by pivotable rotation of the second portion about the axis. The adjustment assembly includes a second arm interconnecting the torsion device and an adjustment device having a first segment, the adjustment device configured to movably receive a connecting adjustment device. The first segment of the adjustment device is configured to follow a predetermined path in a first direction with respect to the axis in response to movement of the adjustment device in a first direction with respect to the first adjustment device. The first segment of the adjustment device is configured to follow a predetermined path in a second direction with respect to the axis in response to movement of the connecting adjustment device in a second direction opposite the first direction with respect to the adjustment device.

An advantage of the present invention is a system applying a substantially uniform support force for the cutterbar, while maintaining performance and extending the service life of the system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 6 is an enlarged end view of a torsion device of the present invention.

FIG. 7 is a cross section taken along line 7-7 from FIG. 6 of the present invention.

Wherever possible, the same reference numbers will be used throughout the drawings to refer to the same or like parts.

DETAILED DESCRIPTION OF THE INVENTION

Figure 1:
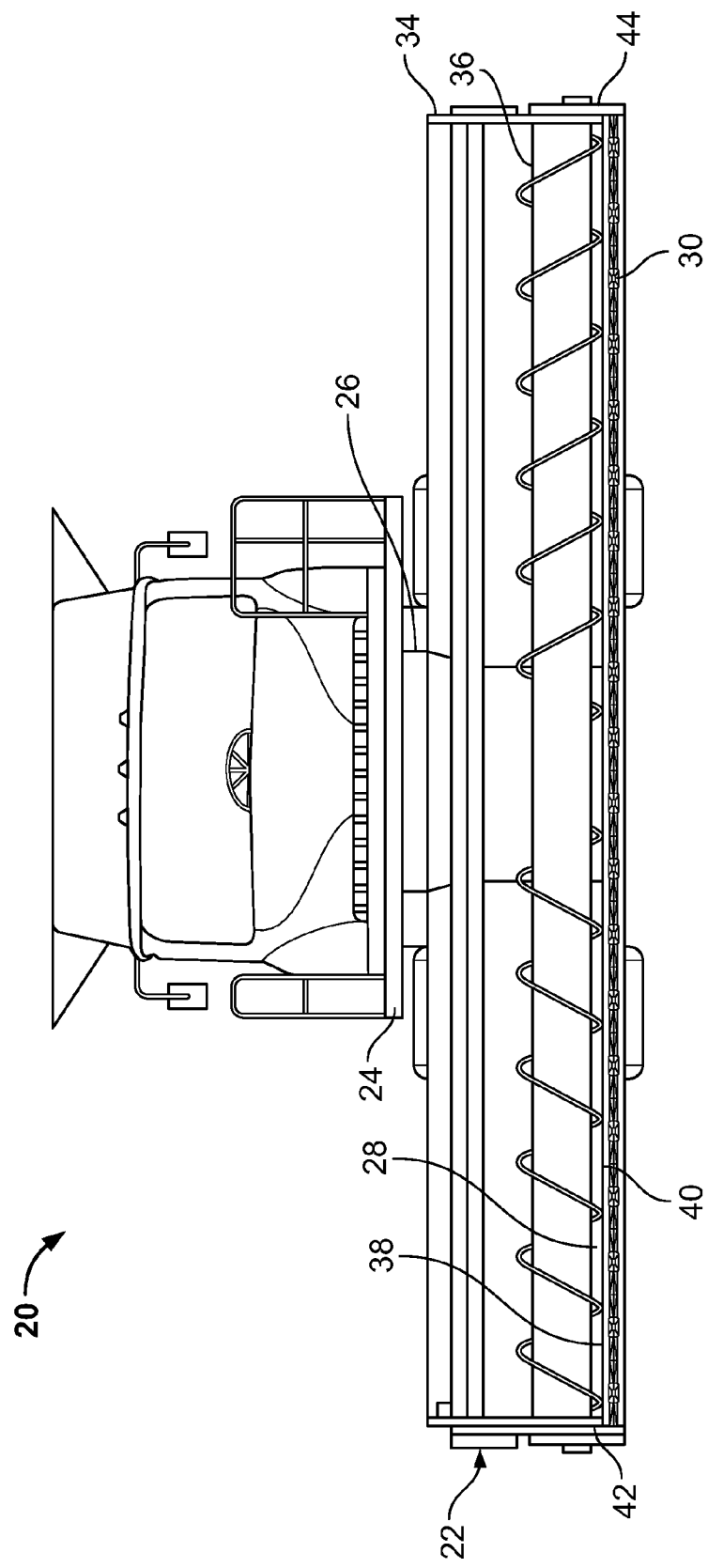
FIG. 1 is a front view of an embodiment of a crop harvesting device and harvesting header of the present invention.

A combine 20, which is a well-known agricultural cutting and harvesting machine, is shown in FIG. 1. Combine 20 includes a header 22, which is configured to cut or sever crops, including (without limitation) small grains (e.g., wheat, soybeans), and to induct the cut or severed crops into a feeder 26. Both functions can be performed as combine 20 moves forward over a crop field.

Figure 2:
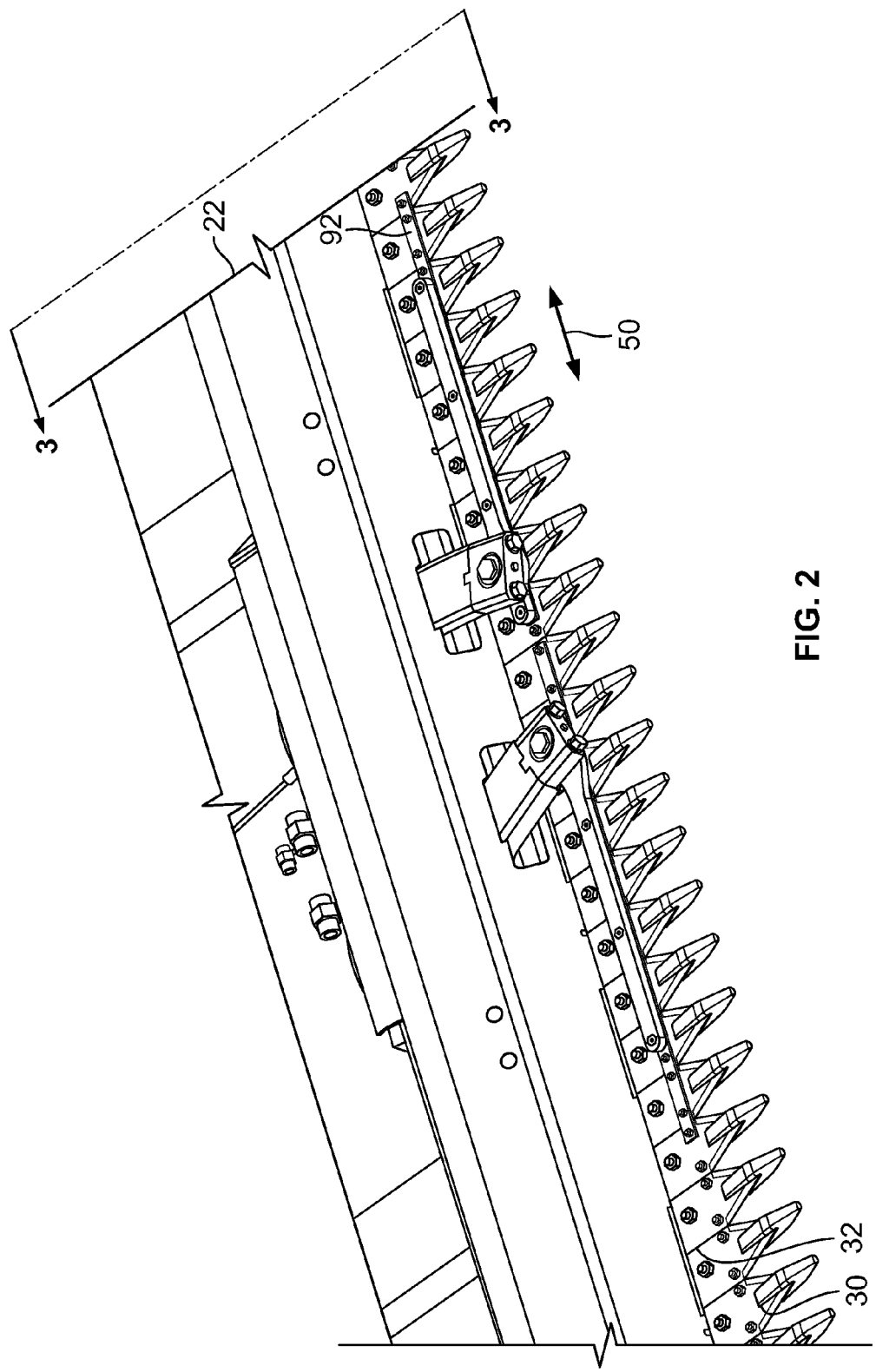
FIG. 2 is a top perspective view of the crop harvesting device of FIG. 1 of the present invention.

Header 22 is attached to a forward end 24 of combine 20 and includes a pan or floor 28 that is supported in desired proximity to the surface of a crop field. Header 22 includes an elongated sidewardly extending sickle 30 along a forward edge portion 32 (see FIG. 2) of floor 28. A cutter or sickle 30 is configured to cut or sever crops, in preparation for induction into a feeder 26. Additionally, header 22 may include an elongate, sidewardly extending reel 34 disposed above sickle 30. Reel 34 is rotatable in a direction suitable for facilitating the induction of cut or severed crops into feeder 26. Header 22 further includes an elongate, rotatable auger 36, which extends in close proximity to a top surface 38 of floor 28 and has helical flights therearound. Auger 36 is configured to cooperate with reel 34 in conveying cut or severed crops to feeder 26, which is configured to convey the cut or severed crops into combine 20 for threshing and cleaning. Alternatively, instead of rotatable auger 36, header 22 may include a draper header or other crop harvesting/gathering header.

Sickle 30 extends along a forward edge 40 of floor 28, and generally is bounded by a first side edge 42 and an opposing second side edge 44, both of floor 28. Sickle 30 is supported by a cutterbar 45 (see FIG. 3) which is likewise supported by a first portion 46 of an elongated member or first arm 48 that will be discussed in further detail below. During operation, sickle 30 reciprocates rapidly to effect a cutting or severing action that cuts or severs plant stems, stalks or other material present between the blades of the sickle. As denoted by arrow 50, the sickle blades can reciprocate sideways.

Figure 3:
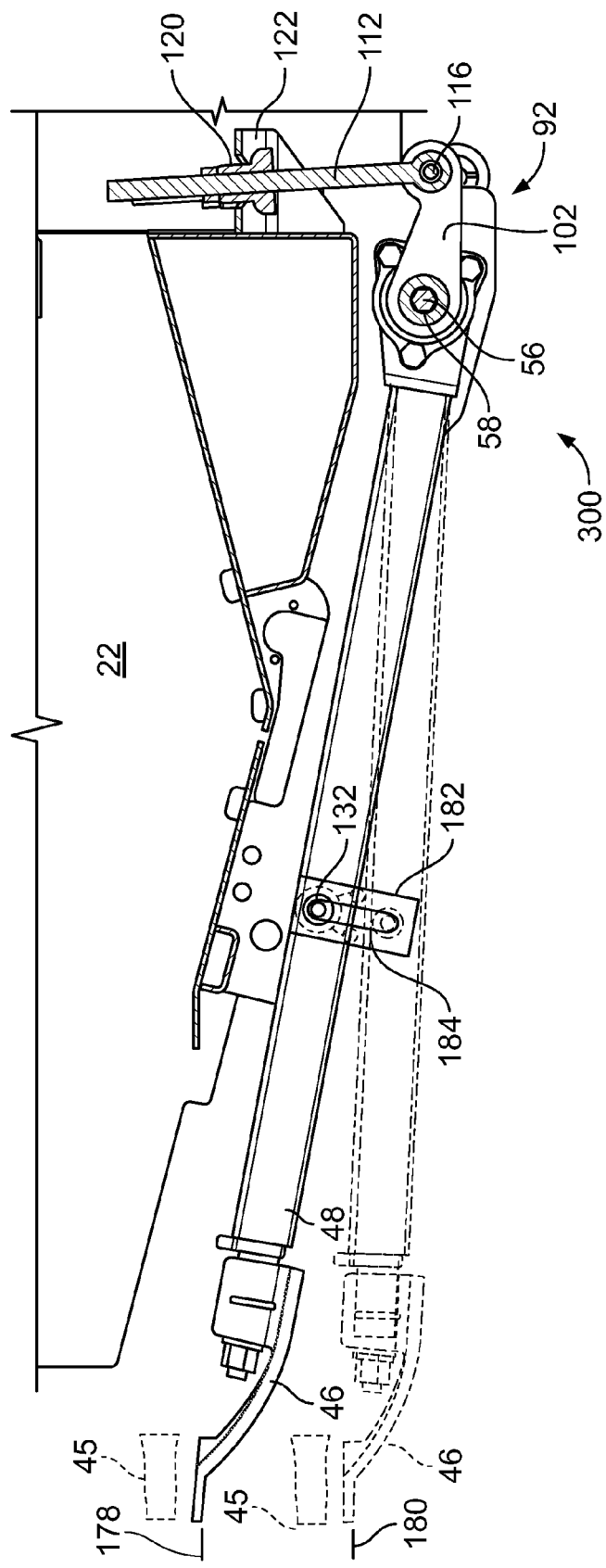
FIG. 3 is a cross section taken along line 3-3 of the present invention.
Figure 4:
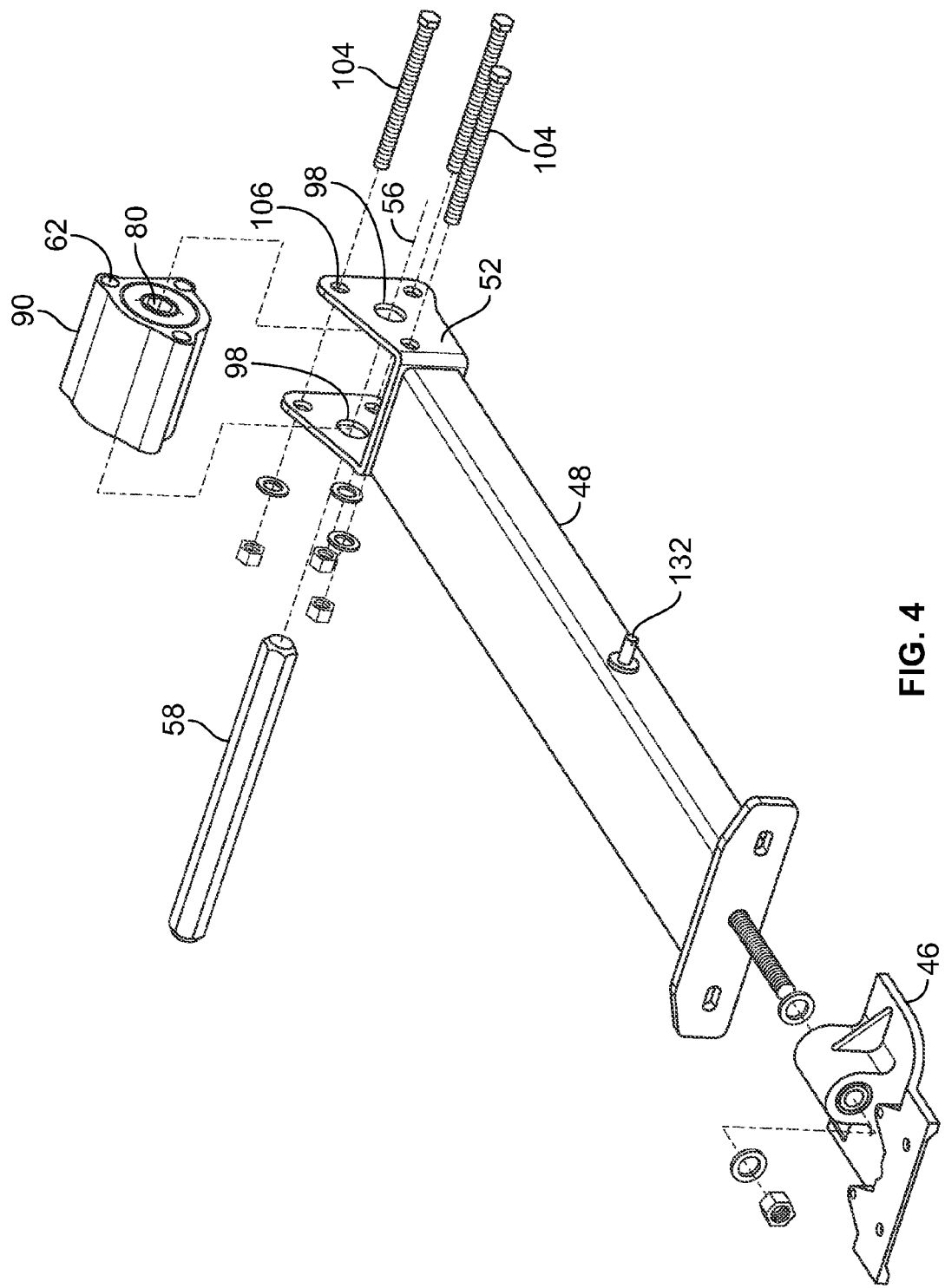
FIG. 4 is an exploded view of a cutterbar support arm of the present invention.
Figure 5:
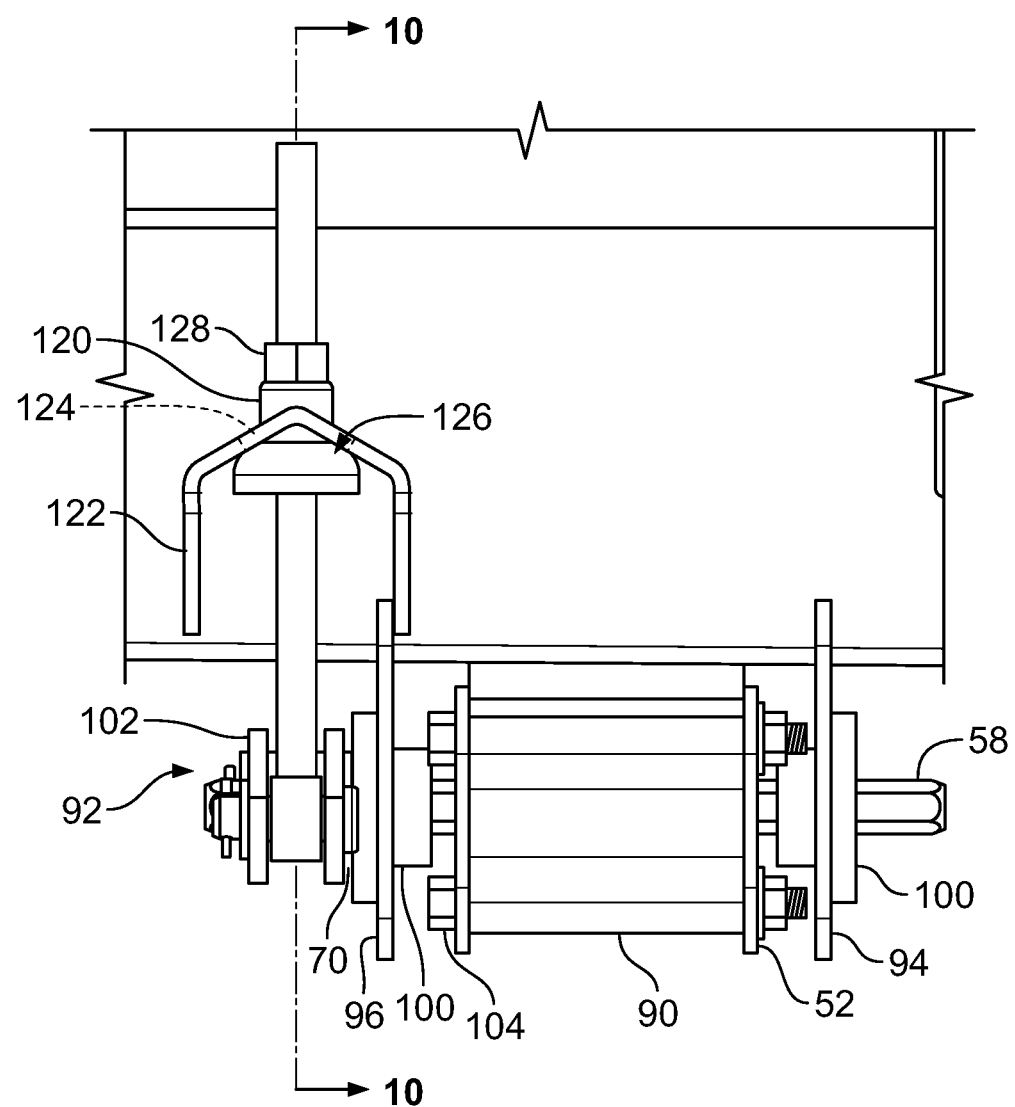
FIG. 5 is a forward-looking end view of an adjustment device of the present invention.
Figure 8:
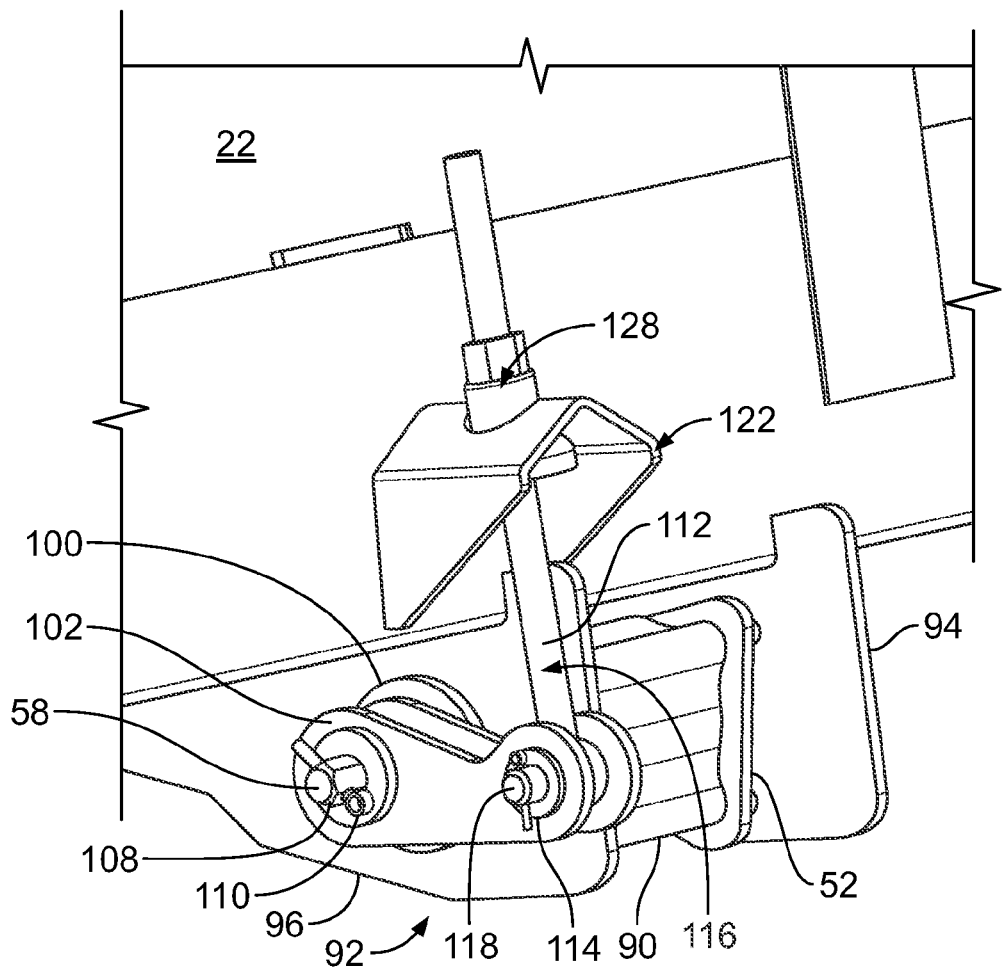
FIGS. 8-9 are enlarged top perspective views of the adjustment device of FIG. 5 shown in different rotational positions of the present invention.
Figure 9:
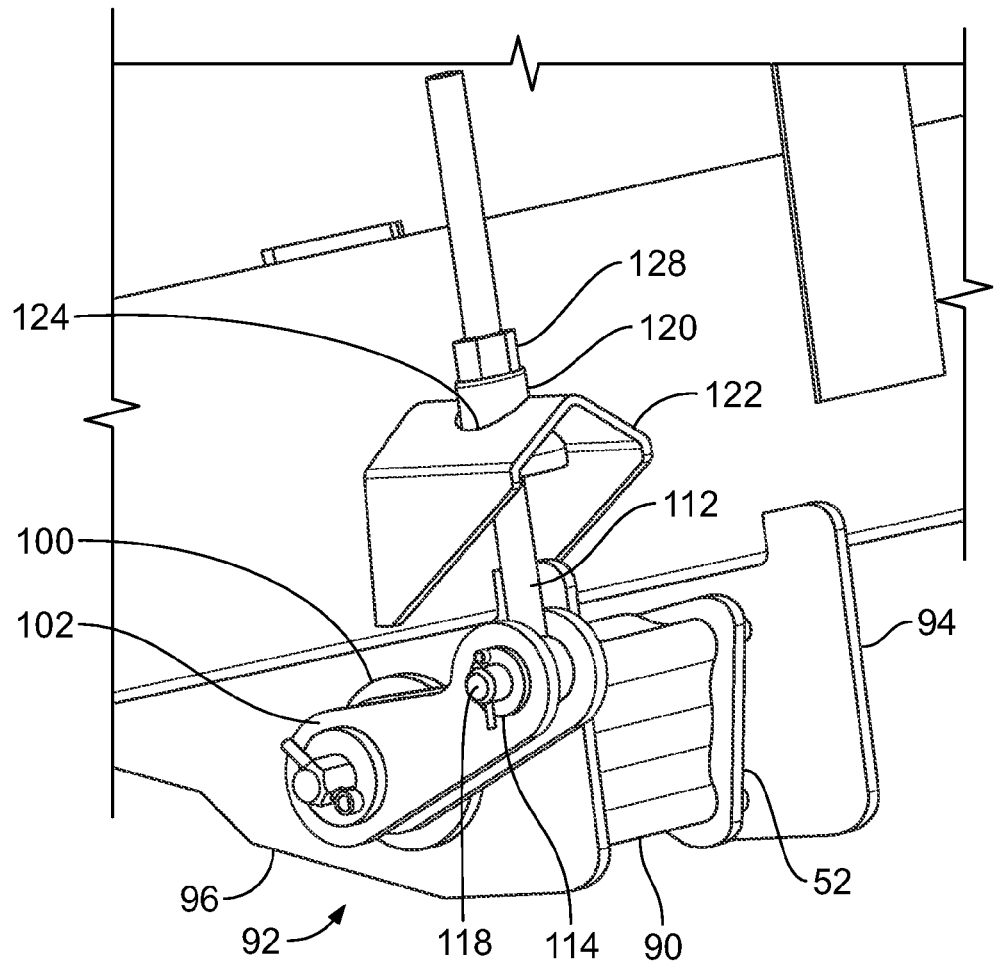

As shown in FIGS. 3-5, a C-bracket or second portion 52 of member or first arm 48 is pivotably secured to header 22 about an axis 56 by a rod 58 having a non-circular periphery, such as a hexagonal periphery. Rod 58 further extends through openings formed in plates 94, 96 that are secured to header 22 and laterally surround second portion 52. In other words, rod 58 extends through each of plates 94, 96, apertures 98 formed in second portion 52 and a torsion device 90 forming part of a cutterbar support system 300. That is, fasteners 104 are first inserted through respective aligned openings 106 in second portion 52 and apertures formed in torsion device 90 to secure the torsion device to the second portion (assembling the exploded view of FIG. 4). Once the torsion device 90 is assembled to the second portion 52, aperture 98 of second portion 52 is positioned between and aligned with openings (not shown) formed in plates 94, 96 and their respective bushings 100, rod 58 may then be inserted through plates 94, 96, bushings 100, second portion 52 and torsion device 90 (see FIG. 5). After insertion of rod 58, the outer periphery of rod 58 and an inside surface 80 (see FIG. 4) of torsion device 90 are placed in a non-rotating relationship, i.e., they become mated surfaces. Finally, opening 108 (see FIG. 8) of second arm 102 is aligned and slid over rod 58, with opening 108 and rod 58 defining mating surfaces and fastener 110 installed in rod 58 to secure rod 58 in its installed position. At this point, in response to first arm 48 being urged into rotational movement about axis 56, by virtue of the mating surfaces between rod 58 and inside surface 80 of torsion device 90 and between opening 108 of second arm 102 and rod 58, rod 58 and second arm 102 would each be urged into rotation about axis 56.

Other operating details may be contained in U.S. Pat. No. 8,051,633, titled Cutterbar Adjustment Support For A Harvesting Header, which is incorporated by reference in its entirety.

FIGS. 6-7 show a side view and a cross section, respectively, of torsion device 90. Torsion device 90 includes a housing 60 includes a plurality of lobes 64 having corresponding apertures 62 formed in the lobes, permitting the housing to be secured to other structure, such as plate 94, 96 (FIG. 5) by mechanical fasteners 104 extending through the other structure and apertures 62. Housing 60 includes an inside surface 66 that may include a tapered surface 82, such as shown in FIG. 7. A member 68, which includes an inside surface 70 and an outside surface 72, is comprised of a resilient material mass that is inserted inside of housing 60. In one embodiment, member 68 is composed of a non-metal, such as a rubber material. Inside surface 66 of housing 60 is configured to receive outside surface 72 of member 68 and define a substantially non-rotational contact therebetween. Stated another way, subsequent to insertion of member 68 inside of housing 60, in response to a rotational movement 86 applied in a clockwise direction about axis 56 to housing 60 and an opposed rotational movement 88 applied in a counter clockwise direction about axis 56 to member 68, inside surface 66 and outside surface 72 should not rotatably move with respect to each other. Such non-rotational contact may be established by application of adhesives, interference-fit (due to the periphery of inside surface 66 being larger than the periphery of outside surface 72), mating surface features, such as splines, or the like.

As further shown in FIGS. 6-7, inside surface 70 of member 68 is configured to receive a sleeve 76 having an outside surface 78 and inside surface 80. Housing 60 and sleeve 76 are composed of substantially rigid materials, such as metals. When member 68 and sleeve 76 are assembled together, inside surface 70 of the member and outside surface 78 of the sleeve define a substantially non-rotational contact therebetween, as discussed above. Inside surface 80 of sleeve 76 defines a geometric shape that is configured to receive an object, such as a shaft, in a substantially non-rotational contact. As shown in FIG. 6, inside surface 80 defines a hexagonal profile, although other profiles may be used. In a further embodiment, sleeve 76 may not be required, if inside surface 70 of member 68 defines a hexagonal profile, for example.

As shown in FIG. 7, member 68 includes recessed ends 74. In one embodiment, recessed ends 74 may be created during the normal cooling process of member 68, which may be composed of rubber or another suitable resilient material. That is, member 68 may be heated to a liquid state and then installed while in the liquid state, such as by pouring or injection molding, into housing 60 between inside surface 70 and outside surface 72. During cooling, member 68 bonds to each of inside surface 70 and outside surface 72. In an alternate embodiment, member 68 may be press-fit between inside surface 70 and outside surface 72. In yet another embodiment, member 68 may be secured between inside surface 70 and outside surface 72 by use of an adhesive.

In summary, by virtue of the collective substantially non-rotational contacts established between corresponding surfaces of housing 60, member 68, sleeve 76 and a shaft received by the sleeve, in response to a rotational movement 86 about axis 56 applied by a shaft 58, and a counter rotational movement 88 about axis 56 applied to oppose the rotational movement applied by the shaft, the member 68 is subjected to a torsional force, which is the basis for the equalizing torsional force provided by the support system.

Referring to FIGS. 3, 5, and 8-10, adjustment assembly 92 is now discussed. Adjustment assembly 92 includes second arm 102 having an aperture 114 located distantly from opening 108 that is pivotably connected, such as by fastener 118 to a first segment 116 of a first adjustment device 112. In one embodiment, first segment 116 includes an eyelet (see FIG. 3) formed in first adjustment device 112, with the first adjustment device being a threaded rod. First adjustment device 112 is movably connected with a second adjustment device 120. In one embodiment, the second adjustment device is a threaded nut configured to mate with the first adjustment device. After assembly, second adjustment device 120 is placed in abutting contact with the portion of header 22. In one embodiment, the portion of header 22 is a bracket 122, in which the abutting contact occurs between a portion of the exterior surface of second adjustment device 120 and at least a portion of a surface of an aperture 124. In one embodiment, at least a portion of second adjustment device 120 includes a tapered surface 126. In one embodiment, tapered surface 126 is curved. Tapered surface 126 is configured to increase the amount of surface area of the abutting contact between the surface of aperture 124 of bracket 122, thereby reducing the amount of resistance required to move second adjustment device 120 with respect to bracket 122. In a further embodiment, the abutting contact surfaces between tapered surface 126 and aperture 124 define conformal surfaces. That is, the abutting contact surfaces substantially conform with each other to maximize the amount of shared surface area to reduce the amount of resistance between the contact surfaces in response to a given force directed perpendicular to the contact surfaces. To urge rotational movement of second adjustment device 120 with respect to bracket 122, a region 128 is provided to receive a tool, such as a wrench, or in another embodiment, the region defines an opening to receive a lever arm.

By virtue of adjustment assembly 92, such as shown in the FIG. 3, first portion 46 of first arm 48 can be selectively raised or lowered. In other words, in response to a rotational movement in a first rotational direction or a first tendency of second adjustment device 120, second adjustment device 120 is placed in abutting contact with bracket 122 such that the length of first adjustment device 112 between bracket 122 and first segment or eyelet 116 is increased, urging second arm 102 to rotate about axis 56. When sufficient rotation of second arm 102 has occurred, and has applied a sufficient torsional force to torsion device 90, first portion 46 of first arm 48 is raised with respect to header 22 subject to the header encountering a stop 132 extending from the first arm. Stop 132 may also be employed to limit the lowest position of first portion 46 with respect to header 22. Conversely, in response to a rotational movement in a second rotational direction or a second tendency of second adjustment device 120, second adjustment device 120 is placed in abutting contact with bracket 122 such that the length of first adjustment device 112 between bracket 122 and first segment or eyelet 116 is decreased, urging second arm 102 to rotate about axis 56. When sufficient rotation of second arm 102 has occurred, and has applied a sufficient torsional force to torsion device 90, first portion 46 of first arm 48 is lowered with respect to header 22. Depending upon the application, multiple first arms 48 may be used to provide support for the cutterbar.

It is also to be understood that while adjustment assembly 92 may be used to selectively raise or lower first portion 46 of first arm 48, the same techniques and interaction between components previously discussed may also be used to selectively increase or decrease a force that may be applied to first portion 46 of first arm 48 in order to raise or lower first portion with respect to header 22. That is, for example, stop 132 extending from first arm 48 may be in abutting contact (not shown) with header 22 such that first arm 48 cannot be further lowered with respect to header 22. For purposes of discussion only, and not intending to be limiting, a force of X pounds may be required to raise first portion 46 with respect to header 22. By moving second adjustment device 120 in a first tendency, without raising/lowering first portion 46 with respect to header 22, a force of Y pounds (Y<X) may then be required to raise first portion 46 with respect to header 22. Conversely, by moving second adjustment device 120 in a second tendency, instead of a first tendency, also without raising/lowering first portion 46 with respect to header 22, a force of Z pounds (Z>X) may then be required to raise first portion 46 with respect to header 22. In other words, for purposes of comparison only, X, Y and Z correspond to magnitudes of forces each being applied in the same direction with respect to the header in order to raise or lower the header. In one embodiment, the magnitude of force required to raise or lower the first portion of each first arm would be the same.

Figure 10:
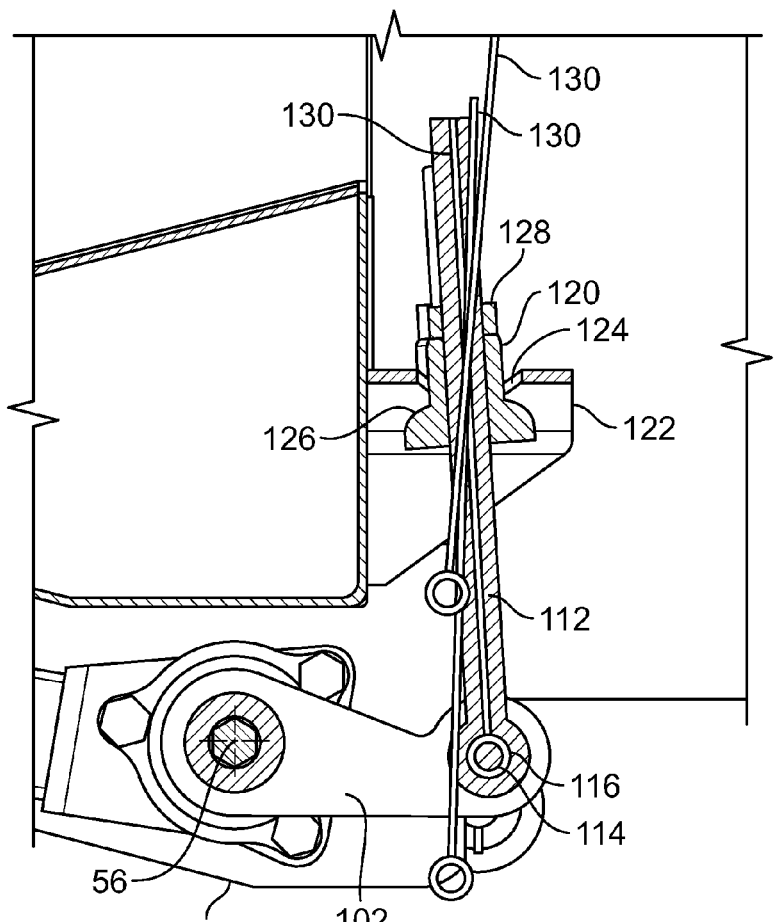
FIG. 10 a cross section taken along line 10-10 of the adjustment device of FIG. 5 of the present invention.

By virtue of the arrangement of adjustment assembly 92, due to first adjustment device 112 being located between second arm 102 and second adjustment device 120, during operation of the adjustment assembly, first segment or eyelet 116 of first adjustment device 112 is configured to follow a predetermined path with respect to axis 56. In the exemplary embodiment as shown in FIG. 10, a predetermined path of first segment or eyelet 116 corresponds to the radius defined by axis 56 and aperture 114 of second arm 102. As a result of this arrangement, over the operating range of adjustment assembly 92, bending forces that could otherwise be applied to first adjustment device and cause damage to the first adjustment device are virtually eliminated. That is, by virtue of the movable abutting contact between tapered surface 126 and the surface of aperture 124 of bracket 122 over the operating range of angular movement of second arm 102 about axis 56, including different positions as shown in respective FIGS. 8 and 9 and as shown in FIG. 10 by a centerline representation 130 of first adjustment device 112, first adjustment device 112 can pivot with virtually no lateral forces associated with the abutting contact.

Figure 11:
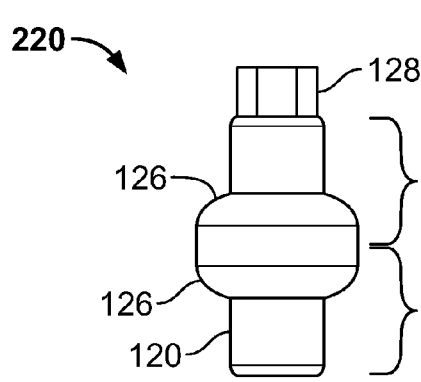
FIGS. 11-12 are embodiments of a second adjustment device of the present invention.
Figure 12:
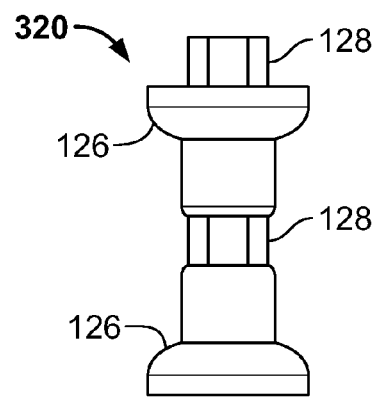

Referring to FIGS. 11 and 12, alternative embodiments of second adjustment device 220, 320 are shown, in which opposed tapered surfaces are combined into a single component. For second adjustment device 220, the larger ends of the tapered surfaces face each other, which would normally require removal of the second adjustment device from the mating first adjustment device if the rotational direction or tendency were to be reverse. For second adjustment device 320, the smaller ends of the tapered surfaces face each other, which should not require removal of the second adjustment device from the mating first adjustment device if the rotational direction or tendency were to be reversed. However, the aperture 124 of bracket 122 would need to be "opened up" to form a slot in order to receive second adjustment device 320. Adjustment regions 128 configured to receive tools could be located as shown or in other locations.

As will be shown in an exemplary embodiment below, a load limiting apparatus, such as load limiting apparatus 394 (FIG. 14) may be utilized with a cutterbar support system. The load limiting apparatus is provided in order to limit the extent of torsional flexure of elastic or resilient member 68 operatively connected to torsion device 90 as a result of forces generated by adjustment assembly 92 in order to raise or lower cutterbar 45 as previously discussed. FIG. 3 shows cutterbar 45 in a raised position 178 versus a lowered position 180. Raised position 178 corresponds to stop 132 being positioned at an upper extent of a slot 184 formed in bracket 182 of frame 22. Lowered position 180 corresponds to stop 132 being positioned at a lower extent of slot 184 formed in bracket 182 of frame 22. The different positions may be used for different kinds of crops. For example, raised position 178 is generally the preferred position for harvesting wheat, while lowered position 180 is generally the preferred position for harvesting soybeans. Prior to utilization of a load limiting apparatus, such as load limiting apparatus 394, which will be discussed in further detail below, in order to raise cutterbar 45 from its lowered position 180 to raised position 178, it had been required to subject elastic or resilient member 68 of torsion device 90 to the entire torsional load generated by the downward force applied by first adjustment device 112 and second arm 102 about axis 56. This extended load resulted in a reduction in performance and service life.

That is, while permitting support and the normal range of movement of cutterbar 45 about axis 56 between lowered position 180 and raised position 178, the positions corresponding to appropriate positions for cutting different types of crops, the load limiting apparatus prevents further rotational movement of elastic or resilient material 68 relative to housing 60 (FIG. 6), thereby limiting the extent of torsional flexure of elastic or resilient member 68. This limitation of rotational movement provides several benefits including, substantially preventing damage to elastic or resilient member 68 associated with such excessive rotational movement of the resilient member relative to its housing, as well as substantially preventing premature loss of structural performance of elastic or resilient member 68, sometimes referred to as "spring characteristics". In addition, the load limiting device may provide structural support of the cutterbar components in some instances or positions, including a reduction or removal of torsional loads normally applied to the resilient material. By reducing or removing torsional loads applied to the resilient material when possible by virtue of the load limiting apparatus, service life, sometimes referred to as fatigue life of the resilient material, as well as the time duration at which high levels of structural performance can be maintained, may be significantly improved.

Figure 13:
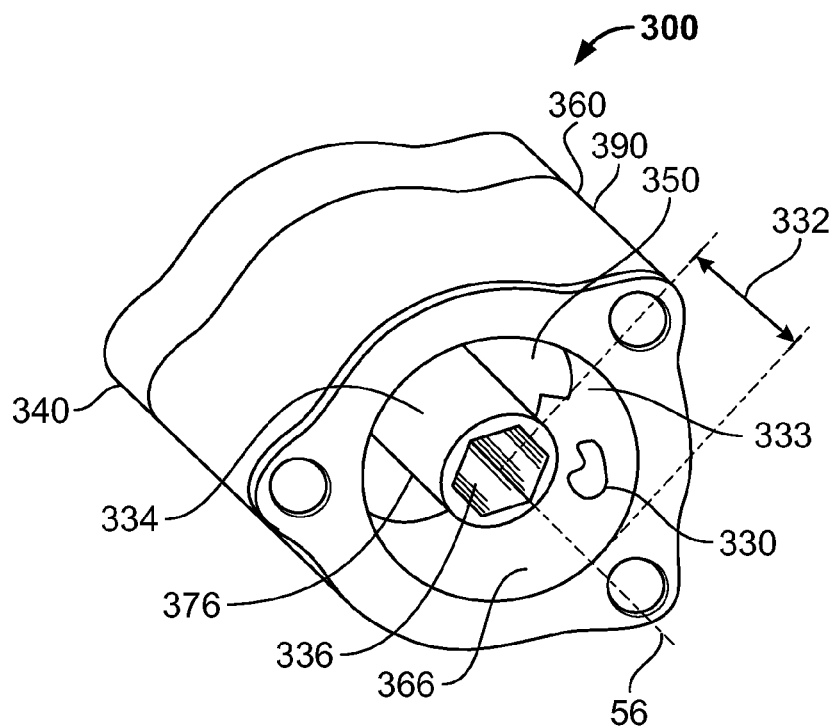
FIG. 13 shows a perspective view of an embodiment of a torsion device of the present invention.
Figure 14:
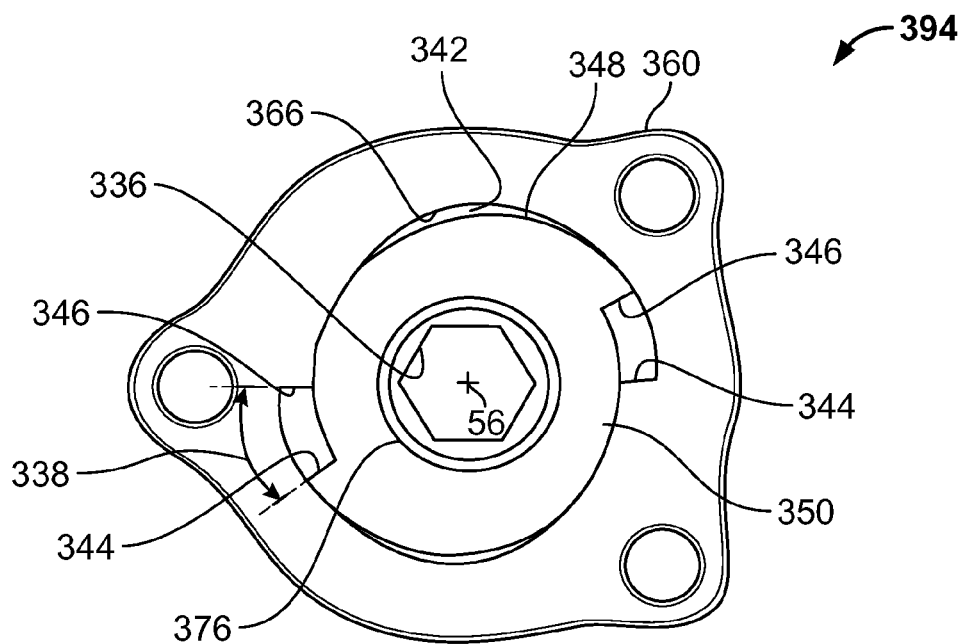
FIG. 14 shows an end view of an embodiment of a torsion device of the present invention.

As shown collectively in FIGS. 13-14, an exemplary embodiment of torsion device 390 includes a load limiting apparatus 394 contained inside or substantially inside of torsion device 390. Torsion device 390 includes a housing 360 having an inside surface 366 that is configured to rotatably receive an inner hub 350 having an outside surface 348. A clearance 342 is provided between inside surface 366 and outside surface 348 to permit inner hub 350 to rotate about an axis 56 relative to housing 360. Inner hub 350 and housing 360 have respective abutting features 346, 344 to limit rotation relative to one another in at least one rotational direction about axis 56. As further shown in FIG. 14, abutting feature 346, 344 defines a tooth in each of respective inner hub 350 and housing 360. As shown FIG. 14, a rotational movement range 338 is provided between corresponding abutting features 346, 344, which is sized to permit an amount of relative rotational movement of respective inner hub 350 relative to housing 360 prior to achieving abutting contact between the corresponding abutting features 346, 344. As shown in FIG. 14, sufficient rotational movement in a clockwise rotational direction, such as by rod 58 (not shown) which is configured to be received by inside surface 336 of inner hub 350, achieves abutting contact between abutting features 346, 344. Upon achieving abutting contact between abutting features 346, 344, additional rotational movement in a clockwise rotational direction such as by rod 58 results in inner hub 350 and housing 360 rotating in unison, acting as a single mechanical assembly.

That is, as shown collectively in FIGS. 13-14, rotational movement range 338 provided between corresponding abutting features 346, 344 permits relative rotational movement of respective inner hub 350 in a clockwise direction relative to housing 360, and therefore results in an amount of torsional flexure of elastic or resilient member 68 prior to achieving abutting contact between the corresponding abutting features 346, 344. However, once abutting contact between corresponding abutting features 346, 344 is achieved, further rotation of inner hub 350 in a clockwise direction relative to housing 360 results in inner hub 350 and housing 360 rotating in unison. Prevention of further relative rotation of inner hub 350 in the clockwise direction relative to housing 360 likewise prevents further torsional loading of resilient or elastic member 68. The amount of rotational movement range 338 provided between corresponding abutting features 346, 344 can be sized such that the amount of torsional flexure of elastic or resilient member 68 achieved can range anywhere between zero and an amount sufficient to raise the cutterbar. In other words, one having ordinary skill in the art appreciates that in the arrangement described, torsional flexure of elastic or resilient member 68 has the effect of reducing the amount of force associated with raising first portion 46, and therefore, the cutterbar (FIG. 3). In one embodiment, the amount of torsional flexure of elastic or resilient member 68 (associated with an amount of rotational movement range 338) can equal the force associated with raising first portion 46. In yet another embodiment, the amount of torsional flexure of elastic or resilient member 68 (associated with an amount of rotational movement range 338) can exceed the force associated with raising first portion 46, although this construction would tend to reduce the beneficial effects the load limiting apparatus.

As further shown in FIG. 13, inner hub 350 and a sleeve 376 extend along axis 56 of torsion device 390. In one embodiment, sleeve 376 and inner hub 350 are of unitary or one-piece construction. An elastic or resilient member 330 is either inserted or formed between a portion 332 of inside surface 366 of housing 360 and outside surface 334 of sleeve 376, in which elastic or resilient member 330 (partially shown in FIG. 13) forms a non-rotational contact between surfaces 366, 334 in a similar manner as previously discussed. In one embodiment, inner hub 350 may be safely positioned at one end of torsion device 390 along axis 56. In another embodiment, inner hub 350 may be located at any position within or substantially within torsion device 390. In yet another embodiment, multiple inner hubs 350 may be located at any position within or substantially within torsion device 390.

In an alternate embodiment as shown in FIG. 13, torsion device 390 optionally includes a housing portion 340 that can be aligned and positioned relative to housing 360 as shown. One having ordinary skill in the art can appreciate that a second inner hub (not shown) can be configured with abutting features similar as shown in FIG. 14, with the exception that the relative rotational movement between the inner hub and the housing portion 340 would be opposite to that shown in FIG. 14. That is, in such a construction, abutting features between corresponding inner hubs and the inside surfaces of corresponding housing portions define a movement limiting apparatus in each opposed rotational direction of the inner hubs relative to the corresponding housing portions.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for supporting a cutterbar of a crop harvesting header comprising:
a first arm pivotably secured to the header, the first arm including a first portion configured to support the cutterbar, the first arm including a second portion including a torsion device having a mass of elastic material connected to an adjustment assembly, the second portion configured to be pivotably rotatable about art axis by the adjustment assembly to selectably increase or decrease a force appliable to the first portion in order to raise or lower the first portion with respect to the header;
a load limiting apparatus that prevents further torsional loading for the mass of elastic material the load limiting assembly attached to the torsion device, the further torsional loading generated from a force equal or less than a force required to raise the first portion by pivotable rotation of the second portion about the axis,
the adjustment assembly including a second arm interconnecting the torsion device and an adjustment device having a first segment, the adjustment device configured to movably receive a connecting adjustment device;
wherein the first segment of the adjustment device is configured to follow a predetermined path in a first direction with respect to the axis in response to movement of the adjustment device in a first direction with respect to the first adjustment device; and wherein the first segment of the adjustment device is configured to follow a predetermined path in a second direction with respect to the axis in response to movement of the connecting adjustment device in a second direction opposite the first direction with respect to the adjustment device.

2. The system of claim 1, wherein the axis is substantially parallel to the cutterbar.

3. The system of claim 1, wherein the load limiting apparatus limiting the amount of torsional force that is applied to the mass of elastic material by pivotable rotation of the second portion about the axis is associated with selectably increasing the force appliable to the first portion to raise the first portion with respect to the header.

4. The system of claim 1, wherein the second portion includes the load limiting apparatus.

5. The system of claim 1, wherein the load limiting apparatus is contained inside the torsion device.

6. The system of claim 5, wherein the torsion device includes an inner hub rotatable relative to a housing about the axis, the inner hub and the housing each having a corresponding abutting feature limiting the relative rotation in at least one rotational direction about the axis.

7. The system of claim 6, wherein in response to sufficient relative rotation in the at least one rotational direction about the axis resulting in corresponding features of the inner hub and the housing achieving abutting contact, additional rotation in the at least one rotational direction about the axis resulting in the inner hub and the housing rotating about the axis in unison.

8. The system of claim 6, wherein the abutting feature is a tooth formed in each of the inner hub and the housing.

9. The system of claim 6, wherein the inner hub and a sleeve extending along the axis of the torsion device.

10. The system of claim 8, wherein the sleeve and the inner hub are of unitary construction.

11. The system of claim is 6, wherein the inner hub is positioned at one end of the torsion device along the axis.

12. The system of claim is 6, wherein the inner hub is positioned between opposed ends of the torsion device along the axis.

13. A system for supporting a cutterbar of a crop harvesting header comprising:
a first arm pivotably secured to the header, the first arm including a first portion configured to support the cutterbar, the first arm including a second portion including a torsion device having a mass of elastic material connected to an adjustment assembly, the second portion configured to be pivotably rotatable about an axis by the adjustment assembly to selectably increase or decrease a force appliable to the first portion in order to raise or lower the first portion with respect to the header;
a load limiting apparatus as part of the torsion device, to prevent additional torsional loading for the mass of elastic material, the additional torsional loading generated from a force in excess of a force required to raise the first portion by pivotable rotation of the second portion about the axis;
the adjustment assembly including a second arm interconnecting the torsion device and an adjustment device having a first segment, the adjustment device configured to movably receive a connecting adjustment device;
wherein the first segment of the adjustment device is configured to follow a predetermined path in a first direction with respect to the axis in response to movement of the adjustment device in a first direction with respect to the first adjustment device; and wherein the first segment of the adjustment device is configured to follow a predetermined path in a second direction with respect to the axis in response to movement of the connecting adjustment device in a second direction opposite the first direction with respect to the adjustment device.

14. The system of claim 13, wherein the load limiting apparatus limiting the amount of torsional force that is applied to the mass of elastic material by pivotable rotation of the second portion about the axis is associated with selectably increasing the force appliable to the first portion to raise the first portion with respect to the header.

15. The system of claim 13, wherein the torsion device includes an inner hub rotatable relative to a housing about the axis, the inner hub and the housing having a corresponding abutting feature limiting rotation relative to each other in at least one rotational direction about the axis.

16. The system of claim 15, wherein in response to sufficient relative rotation in the at least one rotational direction about the axis resulting in corresponding features of the inner hub and the housing achieving abutting contact, additional rotation in the at least one rotational direction about the axis resulting in the inner hub and the housing rotating about the axis in unison.

17. The system of claim 15, wherein the inner hub and a sleeve extend along the axis of the torsion device.

18. The system of claim 15, wherein the abutting feature is a tooth formed in each of the inner hub and the housing.

19. The system of claim 15, wherein the sleeve and the inner hub are of unitary construction.

20. The system of claim is 15, wherein the inner hub is positioned at one end of the torsion device along the axis.

* * * * *